US006811309B1

(12) United States Patent
Ravishanker (10) Patent No.: US 6,811,309 B1
(45) Date of Patent: Nov. 2, 2004

(54) THERMAL SENSOR CIRCUIT (75) Inventor: Krishnamoorthy Ravishanker, Singapore (SG)

(73) Assignee: STMicroelectronics Asia Pacific Pte Ltd, Singapore (SG)

( * ) Notice: Subject to any disclaimer, the term of this patent is extended or adjusted under 35 U.S.C. 154(b) by 0 days.

(21) Appl. No.: 10/088,976

(22) PCT Filed: Jul. 26, 2000

(86) PCT No.: PCT/SG00/00108

§ 371 (c)(1),
(2), (4) Date: Jun. 27, 2002

(87) PCT Pub. No.: WO02/08708

PCT Pub. Date: Jan. 31, 2002

(51) Int. Cl.[7] .............................................. G01K 7/00
(52) U.S. Cl. ........................ 374/178; 327/512; 702/130
(58) Field of Search ......................... 374/178; 327/512, 327/513, 538, 543; 324/441; 702/99, 130; 334/99

(56) References Cited

U.S. PATENT DOCUMENTS

| 3,851,241 | A |   | 11/1974 | Wheatley, Jr. ................. 323/8 |
| 4,088,941 | A |   | 5/1978  | Wheatley, Jr. ................. 323/8 |
| 4,123,698 | A |   | 10/1978 | Timko et al. ................. 323/1 |
| 4,331,888 | A | * | 5/1982  | Yamauchi ................... 374/178 |
| 4,618,816 | A |   | 10/1986 | Monticelli ................... 323/316 |
| 5,389,889 | A | * | 2/1995  | Towne et al. ................ 327/513 |
| 5,402,064 | A | * | 3/1995  | Eck et al. .................... 327/513 |
| 5,419,637 | A | * | 5/1995  | Frye et al. ................... 374/178 |
| 5,444,219 | A | * | 8/1995  | Kelly ........................... 327/512 |
| 5,644,269 | A |   | 7/1997  | Wong et al. .................. 330/261 |
| 5,654,662 | A |   | 8/1997  | Prentice ....................... 327/478 |
| 5,883,543 | A |   | 3/1999  | Weber .......................... 327/530 |
| 5,961,215 | A | * | 10/1999 | Lee et al. ..................... 374/178 |
| 6,055,489 | A | * | 4/2000  | Beatty et al. ................. 374/182 |
| 6,137,341 | A | * | 10/2000 | Friedman et al. ............ 327/513 |
| 6,157,244 | A | * | 12/2000 | Lee et al. ..................... 327/513 |

FOREIGN PATENT DOCUMENTS

EP          0 531 615 A2    3/1993

* cited by examiner

Primary Examiner—Terry D. Cunningham
(74) Attorney, Agent, or Firm—Lisa K. Jorgenson; Robert Iannucci; Seed IP Law Group PLLC (57) ABSTRACT

The present invention provides a thermal sensor circuit for sensing the temperature of an integrated circuit chip, the thermal sensor circuit including: an output comparator for comparing a reference voltage, $V_{ref}$, with a sensed voltage, $V_{sense}$, the sensed voltage being measured over a sensing resistor relative to the ground potential of the circuit; a first circuit to which a reference voltage line in connected to measure $V_{ref}$; a first current mirror providing a first current input to the first circuit and to a compensation circuit; and second current mirror providing a second current input to the compensation circuit and to the sensing resistor. The compensation circuit provides a current gain, defined as the ratio of the second current input to the first current input, for compensating for variations in $V_{ref}$ due to variations of the characteristics of the thermal sensing circuit arising from a manufacturing process of an integrated circuit chip on which the thermal sensor circuit is made by adjusting the second current input in dependence on the variations of the characteristics to thereby vary $V_{sense}$ along with $V_{ref}$.

17 Claims, 7 Drawing Sheets

THERMAL SENSOR CIRCUIT

FIELD OF THE INVENTION

The present invention relates to thermal sensor circuits. In particular, the invention relates to thermal sensor circuits for sensing temperature-related characteristics of a semiconductor device.

BACKGROUND OF THE INVENTION

Integrated circuits (ICs) are generally manufactured on semiconductor substrates (also called wafers) by a process involving deposition. Other semiconductor materials are thermally driven into the substrate. Because of the small size of the ICs, numerous ICs are fabricated using a single dye on the same wafer. The ICs are then separated by cutting. Due to unpredictable variations in the manufacturing process from dye to dye, as well as from wafer to wafer, the characteristics of the individual ICs are not identical. By measuring the characteristics of the manufactured ICs, these variations can be found.

In order to sense the temperature of the IC, a thermal sensor circuit is formed on the chip carrying the IC. If the variations in the temperature sensing characteristics of the sensor circuit are not within an acceptable range, the IC must be discarded as being defective, resulting in a lower IC manufacturing yield. It is therefore desirable to provide compensation for the manufacturing process variations so that the ICs need not be discarded.

The circuit components of the thermal sensor circuit on each IC chip will generally be sufficiently proximate to each other that they will all be affected by the process variations to a similar extent.

Figure 1:
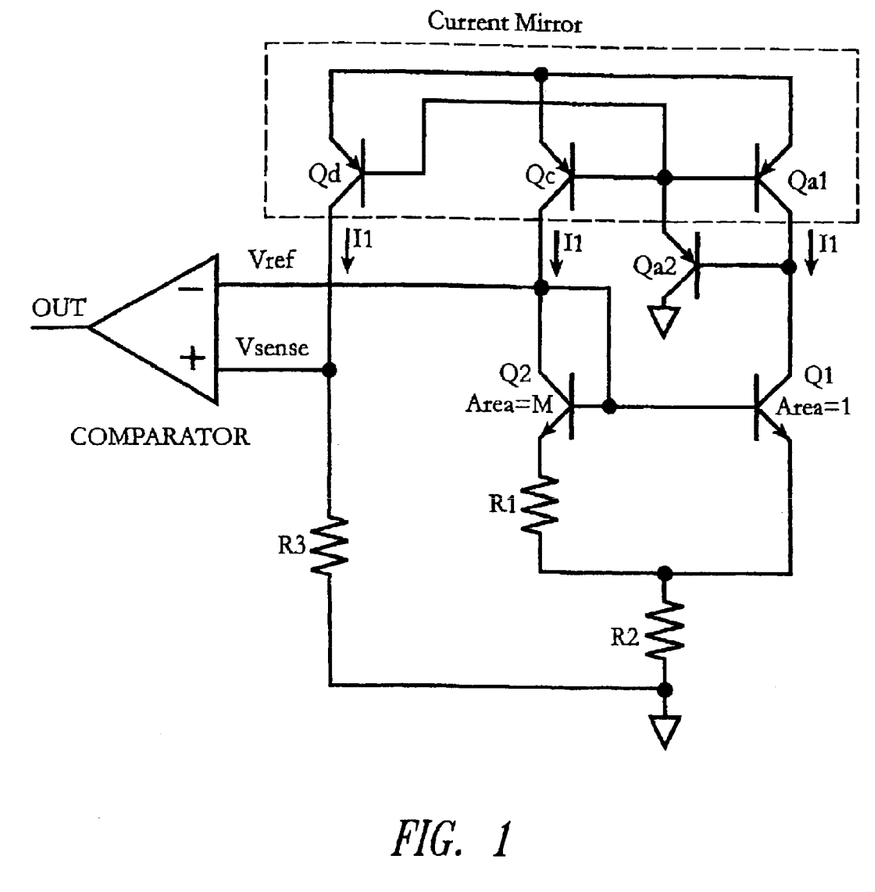
FIG. 1 is a circuit diagram of a known temperature sensing circuit.

An example of a conventional temperature sensor circuit is shown in FIG. 1. The temperature is sensed by comparing the linearly varying voltage at $V_{sense}$ with the (ideally) fixed reference voltage $V_{ref}$. For example, if $V_{sense}$ is 0 volts at 20 degrees Celsius and 1 volt at 120 degrees, for every 10 degrees $V_{sense}$ increases by 0.1 volts. If it is desired to detect when the temperature reaches $100_{degrees}$, $V_{ref}$ should be set to 0.8 volts. When $V_{sense}$ is less than 0.8 volts, the temperature will be below 100 degrees and the comparator output will be low. When $V_{sense}$ is greater than 0.8 volts, the temperature will be greater 100 degrees and the comparator output will be high. In order to accurately sense whether the temperature of the IC has passed a particular threshold temperature, $V_{ref}$ must not vary with temperature. Otherwise this will give a spurious result as to the sensed voltage at the output of the comparator. However, due to IC manufacturing process variations, $V_{ref}$ will sometimes vary with temperature.

In order for all the manufactured ICs to meet the required parameters, the process variations need to be taken into account during the design stage of the ICs. The circuits sensitivity to these process parameters must be minimized to get minimal difference in the performance of the circuit from IC to IC.

Transistors Q1 and Q2 are used to generate a voltage across the resistor R1 which is independent of any process variation. This voltage is effectively a property of the Silicon of the transistors and is therefore accurately reproducible. The voltage across the resistor R1 is given by the difference of the base-emitter potentials of transistors Q1 and Q2, $$V_{be1} - V_{be2} = k \cdot T \cdot ln(M)$$

where k is Boltzmann's constant, T is absolute temperature and M is the ratio (M:1, for M>1) of the emitter areas of Q2 to Q1. The temperature sense voltage $V_{sense}$ is measured over the temperature sensing resistor R3 and is given by, $$V_{sense} + \frac{R3}{R1} \cdot k \cdot T \cdot \ln(M)$$

It is clear from the equation above that the $V_{sense}$ is not affected by variations in the process. since the process dependent components in the equation, resistors R3 and R1, appear as a ratio and will generally be affected by the process variations to the same extent. The "current mirror 1" circuit shown in FIG. 1 is modelled as an ideal p-n-p current mirror for simplicity of explanation.

A reference "bandgap" voltage is obtained at the base of Q1 and Q2, such that the value is almost constant over temperature and is given by, $$V_{ref} = V_{be1} + \frac{R2}{R1} \cdot k \cdot T \cdot \ln(M)$$

As the temperature varying term of the above equation is small relative to the base-emitter voltage of transistor Q1, $V_{ref}$ changes as $V_{be1}$ changes due to process variations.

Figure 3A:
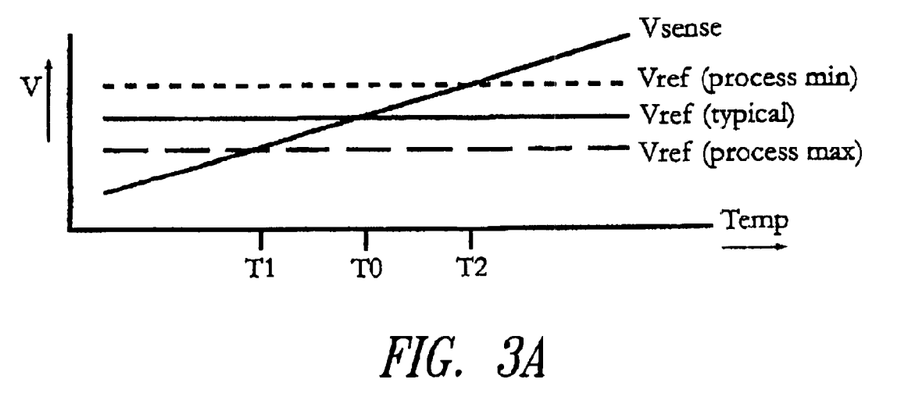
FIG. 3a is a graph of voltage versus temperature, showing the relationship between the sensed voltage and the reference voltage of the temperature sensing circuit of FIG. 1.

FIG. 3a illustrates the relationships of $V_{sense}$ and $V_{ref}$ over varying voltage and temperature. As can be seen from the plot of FIG. 3a, the normal level of Vref will be crossed by the linearly varying Vsense measurement at the desired temperature level, T0. When the process variations have resulted in changed characteristics of the sensing circuit, this will have the effect of changing the level of Vref so that, for characteristics corresponding to the 'process minimum', Vref will be higher and will be crossed by Vsense at a higher temperature, T2, and for characteristics corresponding to the 'process maximum', Vref will be lower and will be crossed by Vsense at a lower temperature, T1. Temperatures T1 and T2 are spurious results, which, if the temperature differential between these two values is large, can cause an unacceptably high number of occurrences of spurious high temperature alert signals for the IC.

Figure 3B:
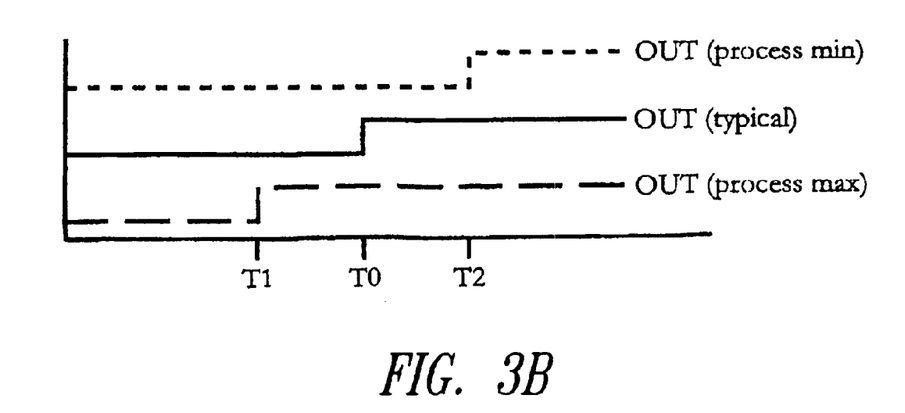

FIG. 3b shows the output of the comparator corresponding to the spurious temperature detections at temperatures T1 and T2 as shown in FIG. 3a.

It is therefore desirable to reduce the temperature difference (ie. T2−T1) over which spurious detections occur for thermal sensing circuits in order to reduce the number of occurrences of spurious high temperature alert signals for the IC.

SUMMARY OF THE INVENTION

The present invention provides a thermal sensor circuit for sensing the temperature of an integrated circuit chip, the thermal sensor circuit including:

an output comparator for comparing a reference voltage, $V_{ref}$, with a sensed voltage, $V_{sense}$, the sensed voltage being measured from a sensing device;

a first circuit to which a reference voltage line is connected to measure $V_{ref}$;

a first current mirror providing a first current input to the first circuit and to a compensation circuit;

a second current mirror providing a second current input to the compensation circuit and to the sensing device; and wherein the compensation circuit provides a current gain, defined as the ratio of the second current input to the first current input, for compensating for variations in $V_{ref}$ due to variations of the characteristics of the thermal sensing circuit arising from manufacture by adjusting the second current input in dependence on the variations of the characteristics to thereby vary $V_{sense}$ with $V_{ref}$.

Preferably, the compensation circuit includes first, second, third and fourth bipolar junction transistors (BJTs) wherein:

the first BJT has a collector terminal connected to the first current input of the first current mirror, a base terminal connected to a common base connection and an emitter terminal connected to ground;

the second BJT has a collector terminal connected to the second current input of the second current mirror, a base terminal connected to the common base connection and an emitter terminal connected to ground;

the third BJT has a collector terminal connected to the second current input, a base terminal connected the first current input and an emitter connected to the common base connection;

the fourth BJT has a collector terminal connected to a voltage supply of the thermal sensor circuit, a base terminal connected to the common base connection and an emitter terminal connected to ground; and the ratio of emitter area of the fourth BJT to the emitter areas of the first, second and third BJTs is N:1, where N>0.

Preferably, the first circuit includes fifth and sixth BJTs, wherein:

the fifth BJT has a collector terminal connected to the first current input, a base terminal connected to the reference voltage line and an emitter terminal connected to an output point of the first circuit via a first resistor;

the sixth BJT has a collector terminal connected to the first current input, a base terminal connected to the reference voltage line and an emitter connected to the output point of the first circuit;

the output point of the first circuit is connected to ground via a second resistor.

Preferably, the ratio of emitter area of the fifth BJT to the emitter area of the sixth BJT is M:1, where M>1. Preferably, each of the first to sixth BJTs is an n-p-n transistor.

Preferably, the current gain is given by:

$$\frac{I2}{I1} = \frac{\beta^2 + (3+N)\beta}{\beta^2 + \beta + (2+N)}$$

where:

I1 is the first current input;

I2 is the second current input; and

β is the common-emitter current gain of each of the first to sixth BJTs.

Preferably, the first and second current mirrors are connected to the voltage supply of the thermal sensor circuit and use p-n-p BJTs to supply the first and second current inputs, respectively.

Advantageously, the thermal sensor circuit provides a compensation function which reduces the temperature range over which spurious temperature detection signals are sent by the comparator by providing a compensation circuit which provides current gain to adjust $V_{sense}$ according to the degree of process variations effected by the manufacturing process of the IC on the thermal sensing circuit.

BRIEF DESCRIPTION OF THE DRAWINGS

FIG. 3b is a plot of the output of the comparator of the temperature sensing circuit of FIG. 1 corresponding to the graph of FIG. 3a;

FIG. 6b is a plot of the output of the comparator of the temperature sensing circuit of FIG. 5 corresponding to the graph of FIG. 6a;

DETAILED DESCRIPTION OF THE PREFERRED EMBODIMENT

Figure 2:
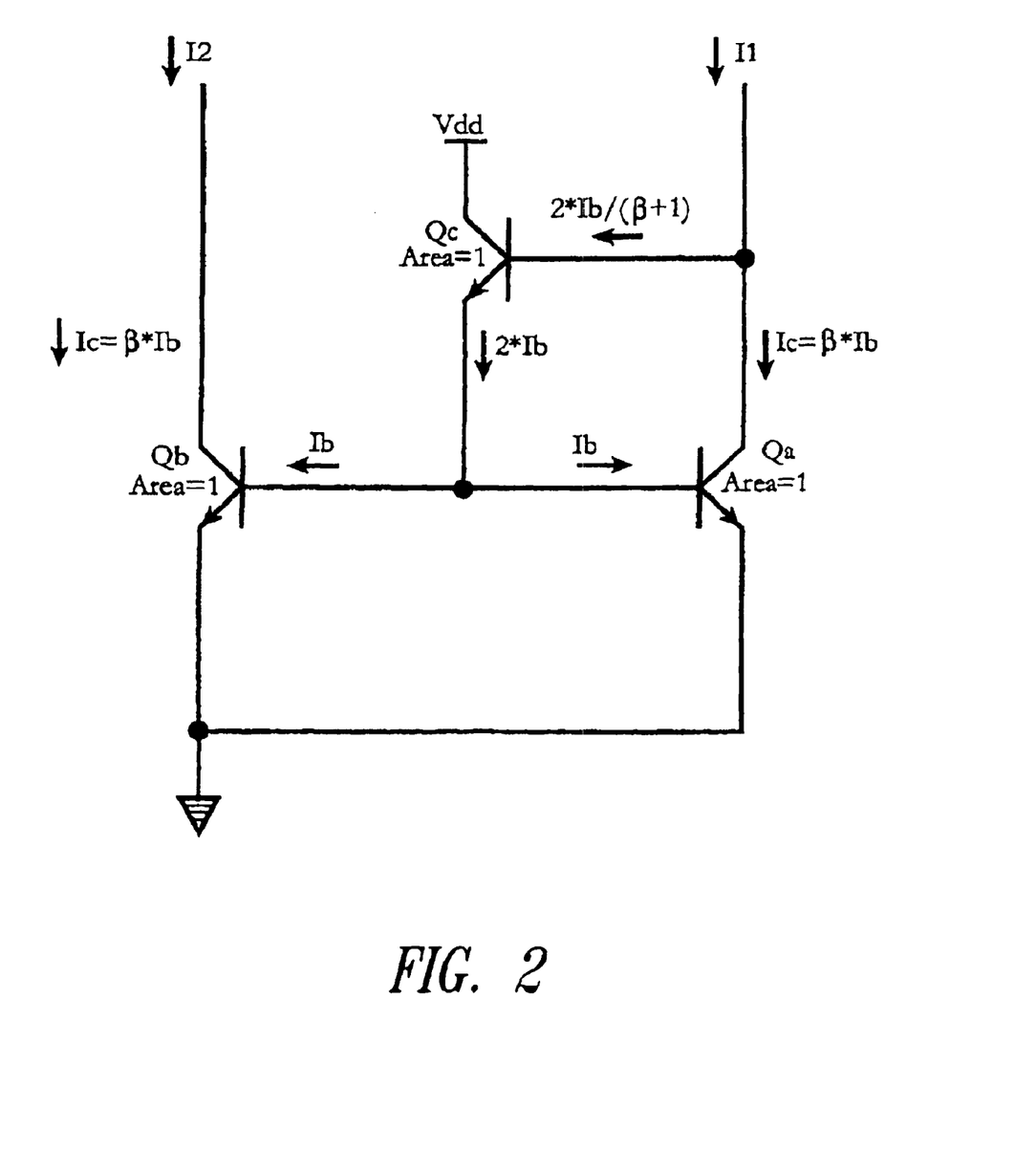
FIG. 2 is a circuit diagram of a known current mirror circuit.

A typical n-p-n current mirror circuit is shown in FIG. 2, the current gain (I2/I1) of which is given by, $$\text{Gain} = \frac{I2}{I1} = \frac{\beta^2 + \beta}{\beta^2 + \beta + 2}$$

where β is the common-emitter current gain of a BJT. Generally, a process minimum corresponds to a smaller β, and is called a process minimum because the circuits tend to operate more slowly. Similarly, a process maximum corresponds to a larger β, where the circuits tend to operate faster. For smaller values of β, the current gain is less than 1. As β increases, the gain approaches 1.

Figure 4:
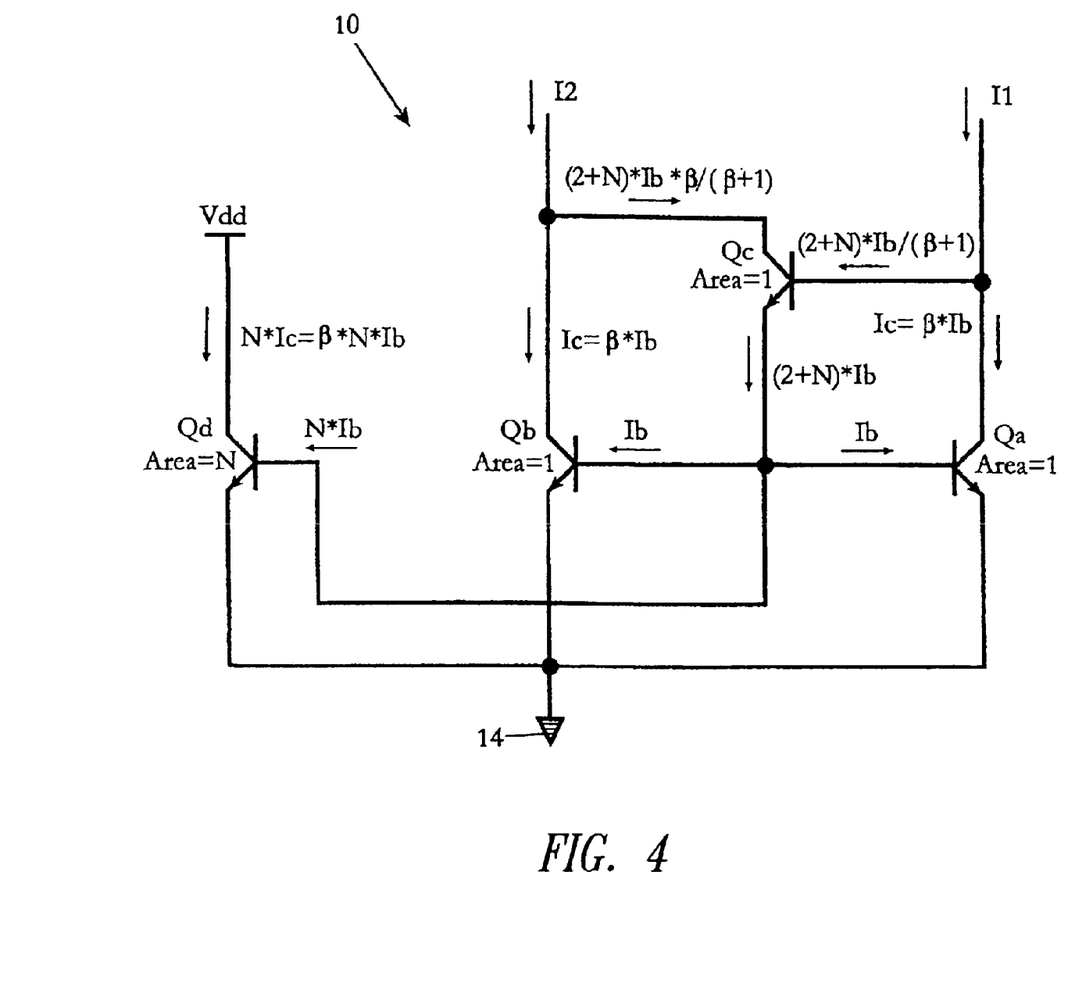
FIG. 4 is a circuit diagram of a modified current mirror circuit employed in an embodiment of the invention.

A compensation circuit 10 is shown in FIG. 4, similar to that shown in FIG. 2 except for a few important differences. Compensation circuit 10 includes an additional transistor Qd, the base terminal of which is connected to the common base connection of current mirror transistors Qa and Qb and the collector terminal of which is connected to the supply voltage, Vdd, of the thermal sensor circuit. The emitter terminal of Qd is connected to ground 14, in common with the emitter terminals of Qa and Qb. The emitter area of Qd is larger than the emitter areas of Qa, Qb and Qc by a ratio of N:1, where N≧0. N will usually be equal to or larger than 1 but may effectively be zero by providing an open circuit in place of Qd. Also in contrast to FIG. 2, instead of the collector of transistor Qc being connected to the supply voltage Vdd, it is connected in parallel with the collector of Qb. The gain of the compensation circuit of FIG. 4 is given by:

$$\frac{I2}{I1} = \frac{\beta^2 + (3+N)\beta}{\beta^2 + \beta + (2+N)}$$

Figure 5:
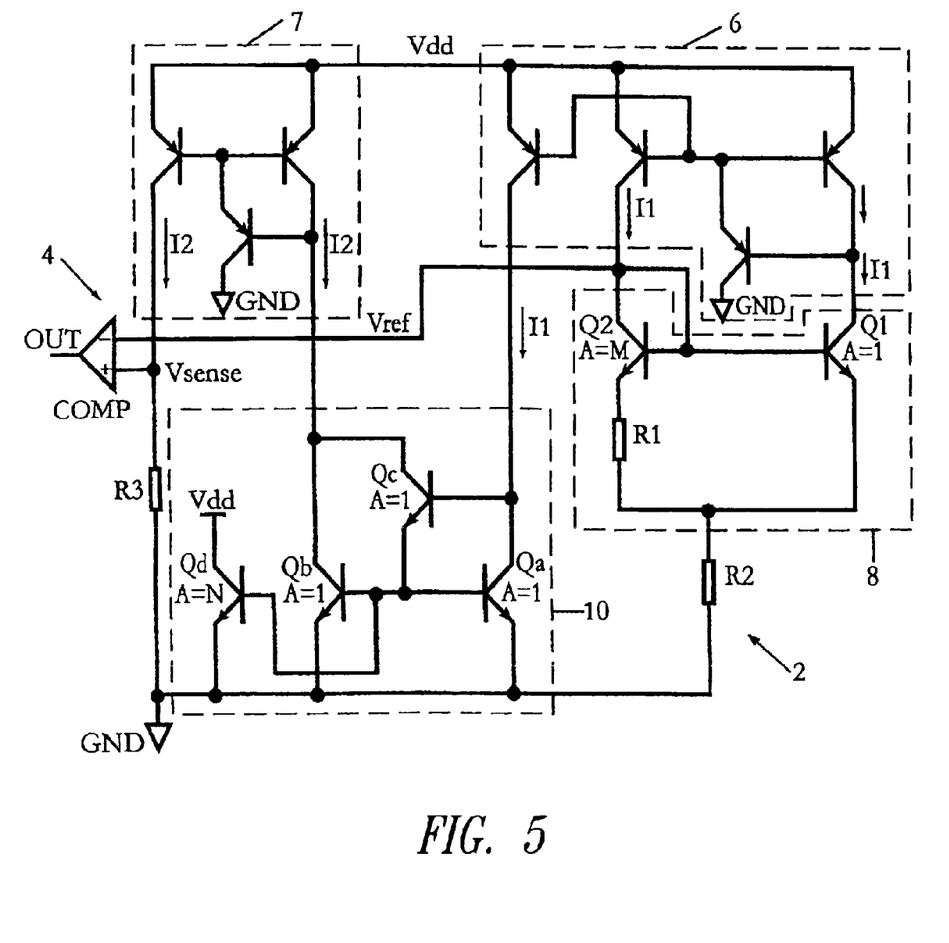
FIG. 5 is a circuit diagram of a temperature sensing circuit according to an embodiment of the invention.

FIG. 5 shows the compensation circuit 10 of FIG. 4 in use in a thermal sensing circuit 2. The compensation circuit 10 is placed in combination with first and second current mirrors 6, 7, a bandgap reference circuit 8 and a comparator 4. The bandgap reference circuit 8 and the comparator 4 operate in a similar manner to that of the thermal sensor circuit of FIG. 1. Transistors Q1, Q2 of the reference circuit and Qa, Qb, Qc and Qd of the compensation circuit are all n-p-n transistors having similar characteristics (apart from the larger emitter areas of Q2 and Qd).

The relative sizes of resistors R1, R2 and R3 serve to define the levels of $V_{ref}$ and $V_{sense}$ and will be set according to the threshold temperature which it is desired to detect the passing of. Typically, R2 and R3 are of similar values while R1 is relatively much smaller.

The reference current I1 from the first current mirror 6 is given a current gain by the compensation circuit 10 to draw a compensated output current I2 from current mirror 7. The current I2 drawn through the compensation circuit must, by the nature of an ideal current mirror, be reflected through the other current supply line of the current mirror 7 which runs through thermal sensing resistor R3 to give a potential difference over R3 corresponding to $V_{sense}$. Thus, the compensation circuit 10 provides a current gain of I2 with respect to I1. The current gain provided (I2/I1) is more than the typical value when the process is minimum and less than the typical gain when the process is maximum.

Some sample gain values are calculated below:

Process minimum→small β; increased $V_{ref}$.
Process mean→typical β; normal $V_{ref}$.
Process maximum→larger β; decreased $V_{ref}$.
For the typical current mirror:
Small β=5; I2/I1=0.938<1;
Typical β=20; I2/I1=0.995.
Larger β=50; I2/I1=0.999=1.
For the compensation circuit, with N=1:
Small β=5; I2/I1=1.364>1;
Typical β=20; I2/I1=1.135.
Larger β=50; I2/I1=1.058≈1.

The thermal sensor circuit 2 having the compensation circuit 10 therefore provides compensation for the process variations by providing a current gain to adjust the sensed voltage, $V_{sense}$, over thermal sensing resistor R3. The compensated $V_{sense}$ is given by:

$$V_{sense\ [compensated]} = \frac{\beta^2 + (3+N)\beta}{\beta^2 + \beta + (2+N)} \cdot \frac{R3}{R1} \cdot k \cdot T \cdot \ln(M)$$

In an alternative embodiment of the invention, the current mirrors 6 and 7 may be implemented with n-p-n transistors and the reference and compensation circuits may be implemented with p-n-p transistors. This would necessitate a reversal of polarity for the terminals of the comparator 4 and would require changing the relative roles of the voltage supply and ground lines.

Figure 6A:
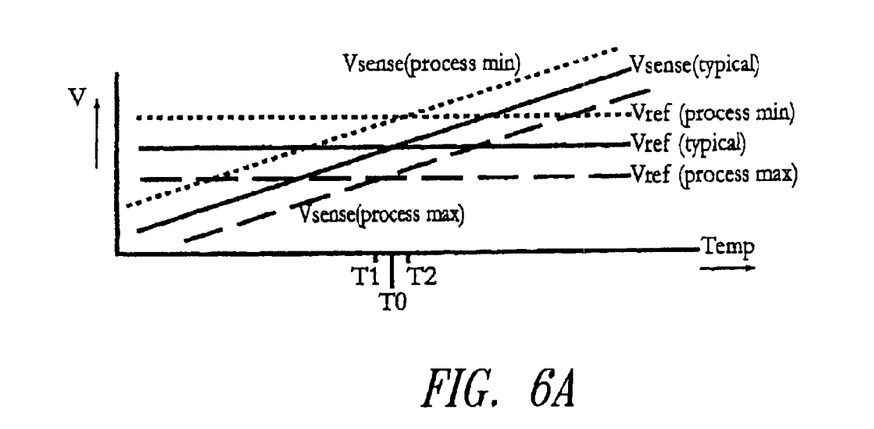
FIG. 6a is a graph of voltage versus temperature, showing the relationship between the sensed voltage and the reference voltage of the temperature sensing circuit of FIG. 5.
Figure 6B:
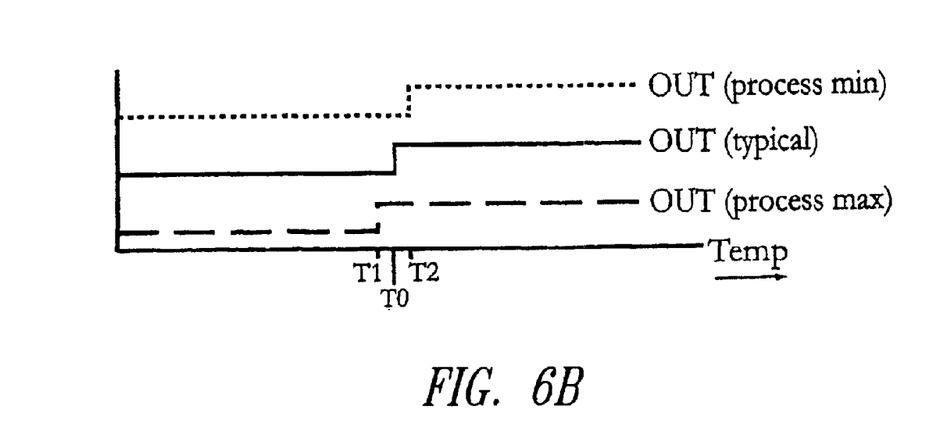

FIG. 6a shows a plot (which is not to scale) of $V_{ref}$ and $V_{sense}$ versus temperature for the compensated thermal sensor circuit 2. It can be seen that $V_{sense}$ is increased for process minimum scenarios and is decreased for process maximum scenarios. This compensation of $V_{sense}$ reduces the temperature range over which spurious temperature measurements are recorded, leading to greater accuracy of the thermal sensor circuit, fewer ICs being discarded because of irredeemable process variations and a correspondingly higher IC manufacturing yield. FIG. 6b shows the output of the comparator 4 corresponding to reduced band of spurious temperature detections at temperatures T1 and T2 as shown in FIG. 6a.

Advantageously, by appropriately choosing the area of Qd, the current gain of the compensation circuit can be modified to effectively provide a 'DC shift' to the measured $V_{sense}$ in order to track the variations in Vref due to process variations, thereby enabling an accurate sensing of the temperature independent of the process variations. The amount of variation in the current gain, and hence compensation of Vsense, can be adjusted by changing the emitter area N of transistor Qd to suit a particular batch of IC chips.

Figure 7:
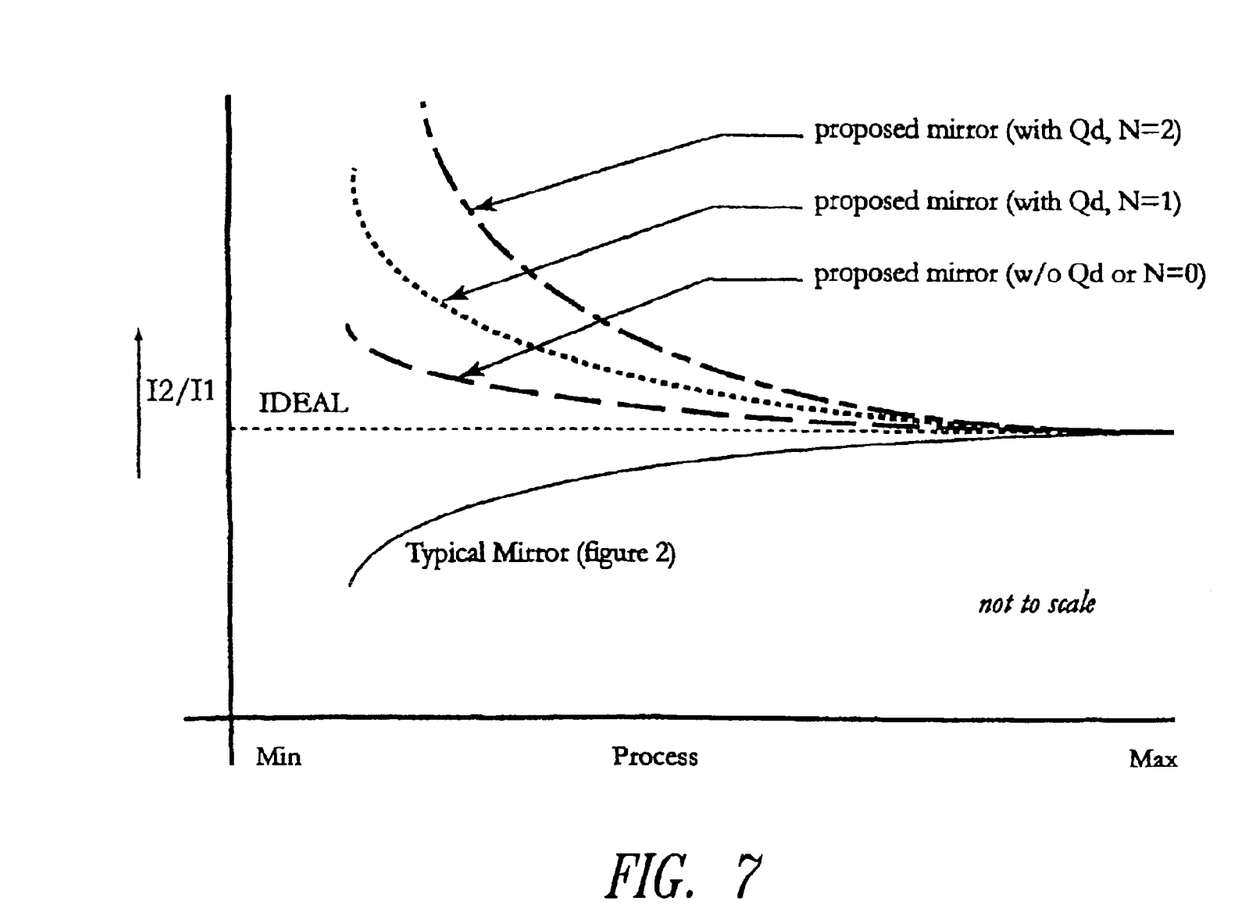
FIG. 7 is a comparative plot of current gain versus process variation.

FIG. 7 shows the relationship between the current gain and the process variations for both the proposed compensation circuit (for N=0, 1 and 2) and an exemplary "typical mirror" circuit employed in place of the compensation circuit in FIG. 5. The use of the "typical mirror" in place of the compensation circuit in FIG. 5 is not believed to form part of the prior art but is used here for the purposes of comparison.

What is claimed is:

1. A thermal sensor circuit for sensing the temperature of an integrated circuit chip, the thermal sensor circuit including:

an output comparator for comparing a reference voltage, $V_{ref}$, with a sensed voltage, $V_{sense}$, the sensed voltage being measured from a sensing device;

a first circuit to which a reference voltage line is connected to supply $V_{ref}$ to the output comparator;

a first current mirror providing a first current input to the first circuit and to a compensation circuit;

a second current mirror providing a second current input to the compensation circuit and to the sensing device, and wherein the compensation circuit provides a current gain, defined as the ratio of the second current input to the first current input, for compensating for variations in $V_{ref}$ due to variations of the characteristics of the thermal sensing circuit arising from manufacture by adjusting the second current input in dependence on the variations of the characteristics to thereby vary $V_{sense}$ with $V_{ref}$, wherein the compensation circuit includes first, second, third and fourth bipolar junction transistors (BJTs) and wherein:

the first BJT has a collector terminal connected to the first current input of the first current mirror, a base terminal connected to a common base connection and an emitter terminal connected to ground;

the second BJT has a collector terminal connected to the second current input of the second current mirror, a base terminal connected to the common base connection and an emitter terminal connected to ground;

the third BJT has a collector terminal connected to the second current input, a base terminal connected the first current input and an emitter connected to the common base connection;

the fourth BJT has a collector terminal connected to a voltage supply of the thermal sensor circuit, a base terminal connected to the common base connection and an emitter terminal connected to ground; and the ratio of emitter area of the fourth BJT to the emitter areas of the first, second and third BJTs is N:1, where N>0.

2. The thermal sensor circuit of claim 1, wherein the first circuit includes fifth and sixth BJTs, and wherein:

the fifth BJT has a collector terminal connected to the first current input, a base terminal connected to the reference voltage line and an emitter terminal connected to an output point of the first circuit via a first resistor;

the sixth BJT has a collector terminal connected to the first current input, a base terminal connected to the reference voltage line and an emitter connected to the output point of the first circuit; and the output point of the first circuit is connected to ground via a second resistor.

3. The thermal sensor circuit of claim 2, wherein the ratio of emitter area of the fifth BJT to the emitter area of the sixth BJT is M:1, where M>1.

4. The thermal sensor circuit of claim 2 wherein each of the first to sixth BJTs is an n-p-n transistor.

5. The thermal sensor circuit of claim 2 wherein the current gain is given by:

$$\frac{I2}{I1} = \frac{\beta^2 + (3+N)\beta}{\beta^2 + \beta + (2+N)}$$

where:
I1 is the first current input;
I2 is the second current input; and
β is the common-emitter current gain of each of the first to sixth BJTs.

6. The thermal sensor circuit of claim 1, wherein the first and second current mirrors are connected to the voltage supply of the thermal sensor circuit and use p-n-p BJTs to supply the first and second current inputs, respectively.

7. A thermal sensor circuit for sensing the temperature of an integrated circuit chip, the thermal sensor circuit comprising:
a current source that supplies an input current;
a sensing device that produces a sensed voltage corresponding to the temperature of the integrated circuit chip;
a reference voltage circuit that produces a reference voltage;
a comparator that receives the reference and sensing voltages and outputs a signal that reflects the temperature;
a first current mirror having first and second mirror legs respectively carrying first and second mirror currents that are directly proportional to each other, the first mirror leg being in series with the sensing device; and
a compensation circuit that includes:
an input that receives the input current;
a first transistor coupled between the input and a first supply voltage reference and having a control terminal;
a second transistor coupled between the second mirror leg and the first supply reference and having a control terminal coupled to the control terminal of the first transistor; and
a third transistor coupled between a second supply voltage reference and the first supply voltage reference and having a control terminal coupled to the control terminals of the first and second transistors.

8. The thermal sensor circuit of claim 7 wherein the compensation circuit further includes a fourth transistor coupled between the second mirror leg and the control terminals of the first, second, and third transistors, and having a control terminal coupled to the input of the compensation circuit.

9. The thermal sensor circuit of claim 8 wherein the first, second, third, and fourth transistors are bipolar transistors.

10. A thermal sensor circuit for sensing the temperature of an integrated circuit chip, the thermal sensor circuit comprising:
a sensing device that produces a sensed voltage corresponding to the temperature of the integrated circuit chip;
a first current mirror having first and second mirror legs respectively carrying first and second mirror currents that are directly proportional to each other, the first mirror leg being in series with the sensing device; and
a compensation circuit that includes:
an input that receives the input current;
a first transistor coupled between the input and a first supply voltage reference and having a control terminal;
a second transistor coupled between the second mirror leg and the first supply reference and having a control terminal coupled to the control terminal of the first transistor; and
a third transistor coupled between a second supply voltage reference and the first supply voltage reference and having a control terminal coupled to the control terminals of the first and second transistors;
an output comparator having first and second inputs and an output, the first input being coupled to the sensing device to receive the sensed voltage;
a reference voltage circuit having an input and an output at which a reference voltage is produced, the output of the reference voltage circuit being coupled to the second input of the output comparator; and
a second current mirror having a first mirror leg coupled to the reference voltage circuit, and a second mirror leg coupled to the input of the compensation circuit to provide the input current.

11. The thermal sensor circuit of claim 10 wherein the second current mirror has a third mirror leg and the reference voltage circuit includes:
a fourth transistor coupled between the third leg of the second current mirror and the first supply voltage reference and having a control terminal corresponding to the output of the voltage reference circuit; and
a fifth transistor coupled between the first leg of the second current mirror and the first supply voltage reference and having a control terminal corresponding to the output of the voltage reference circuit.

12. The thermal sensor circuit of claim 11, wherein a ratio of an emitter area of the fifth transistor to an emitter area of the sixth transistor is M:1, where M>1.

13. The thermal sensor circuit of claim 10 wherein the first and second current mirrors are connected to the second supply voltage reference and include p-n-p bipolar transistors in their respective first and second mirror legs.

14. A thermal sensor circuit for sensing the temperature of an integrated circuit chip, the thermal sensor circuit comprising:
a sensing device that produces a sensed voltage corresponding to the temperature of the integrated circuit chip;
an output comparator having first and second inputs and an output, the first input being coupled to the sensing device to receive the sensed voltage;
a reference voltage circuit having a first input and an output at which a reference voltage is produced, the output of the reference voltage circuit being coupled to the second input of the output comparator;
a first current mirror having first and second outputs, the first output being coupled to the first input of the reference voltage circuit;
a second current mirror having an input and an output, the output being coupled to the sensing device; and
a compensation circuit having an input and an output coupled respectively to the second output of the first current mirror and the input of the second current mirror, wherein the compensation circuit includes:

a first transistor coupled between the input of the compensation circuit and a first supply voltage reference and having a control terminal;

a second transistor coupled between the output of the compensation circuit and the first supply voltage reference and having a control terminal coupled to the control terminal of the first transistor; and a third transistor coupled between a second supply voltage reference and the first supply voltage reference and having a control terminal coupled to the control terminals of the first and second transistors.

15. The thermal sensor circuit of claim 14 wherein the compensation circuit further includes a fourth transistor coupled between the output of the compensation circuit and the control terminals of the first, second, and third transistors, and having a control terminal coupled to the input of the compensation circuit.

16. The thermal sensor circuit of claim 15 wherein the first, second, third, and fourth transistors are bipolar transistors.

17. A thermal sensor circuit for sensing the temperature of an integrated circuit chip, the thermal sensor circuit comprising:

a sensing device that produces a sensed voltage corresponding to the temperature of the integrated circuit chip;

an output comparator having first and second inputs and an output, the first input being coupled to the sensing device to receive the sensed voltage;

a reference voltage circuit having a first input and an output at which a reference voltage is produced, the output of the reference voltage circuit being coupled to the second input of the output comparator;

a first current mirror having first and second outputs, the first output being coupled to the first input of the reference voltage circuit;

a second current mirror having an input and an output, the output being coupled to the sensing device; and a compensation circuit having an input and an output coupled respectively to the second output of the first current mirror and the input of the second current mirror, wherein the first current mirror includes:

a first mirror leg coupled between a supply voltage and the input of the compensation circuit;

a second mirror leg coupled between the supply voltage and the first input of the reference voltage circuit; and a third mirror leg coupled between the supply voltage and a second input of the reference voltage circuit.

* * * * *